(12) United States Patent
Chan

(10) Patent No.: US 6,874,933 B1
(45) Date of Patent: Apr. 5, 2005

(54) APPARATUS FOR DIGITAL TEMPERATURE MEASUREMENT IN AN INTEGRATED CIRCUIT

(75) Inventor: Wai Cheong Chan, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/272,354

(22) Filed: Oct. 15, 2002

(51) Int. Cl.[7] .................................................. G01K 7/00
(52) U.S. Cl. .......................... 374/171; 374/1; 377/25; 331/66
(58) Field of Search ............................... 374/163, 170, 374/171, 178, 1; 377/25; 331/66

(56) References Cited

U.S. PATENT DOCUMENTS

| | | | | | |
|---|---|---|---|---|---|
| 4,150,573 A | * | 4/1979 | Iinuma et al. | ............... | 374/170 |
| 4,210,024 A | * | 7/1980 | Ishiwatari et al. | ........... | 374/171 |
| 4,359,285 A | * | 11/1982 | Washburn | ...................... | 331/66 |
| 4,371,271 A | * | 2/1983 | Bellet | .......................... | 374/163 |
| 4,448,549 A | * | 5/1984 | Hashimoto et al. | .......... | 374/170 |
| 4,464,067 A | * | 8/1984 | Hanaoka | ..................... | 374/170 |
| 4,505,599 A | * | 3/1985 | Nonaka | ....................... | 374/163 |
| 4,559,954 A | * | 12/1985 | Murase | ........................ | 374/171 |
| 4,602,871 A | * | 7/1986 | Hanaoka | ..................... | 374/170 |
| 4,658,407 A | * | 4/1987 | Iwama | ........................ | 374/170 |
| 5,513,235 A | * | 4/1996 | Douglass et al. | ........... | 374/170 |
| 5,892,448 A | * | 4/1999 | Fujikawa et al. | ............ | 374/163 |
| 5,899,570 A | * | 5/1999 | Darmawaskita et al. | .... | 374/170 |
| 6,091,255 A | * | 7/2000 | Godfrey | ...................... | 374/170 |
| 6,115,441 A | * | 9/2000 | Douglass et al. | ........... | 374/170 |
| 6,390,672 B1 | * | 5/2002 | Vail et al. | .................... | 374/170 |
| 6,629,776 B2 | * | 10/2003 | Bell et al. | .................... | 374/170 |
| 6,695,475 B2 | * | 2/2004 | Yin | ............................. | 374/171 |
| 2003/0156622 A1 | * | 8/2003 | Gold et al. | ................. | 374/170 |

OTHER PUBLICATIONS

Malmstadt, H. V., and Enke, C.G.; "Digital Electronics for Scientists," (W.A. Benjamin, Inc., New York), Jun. 1969, pp. 524–532.*

* cited by examiner

Primary Examiner—Diego Gutierrez
Assistant Examiner—Stanley J. Pruchnic, Jr.
(74) Attorney, Agent, or Firm—Darby & Darby PC; John W. Branch

(57) ABSTRACT

A circuit for measuring temperature with all digital components in an integrated circuit. During manufacture, the number of clock period cycles during a known period of time at a predetermined temperature is stored in non-volatile memory. Later, during use of the integrated circuit, a clock circuit is activated and each cycle of its period is counted during a known length of time. Using the previously saved number of clock circuit cycles at a predetermined temperature and a current count of clock cycles for another known length of time, the current period of the clock circuit can be calculated and used to determine the current temperature.

15 Claims, 5 Drawing Sheets

APPARATUS FOR DIGITAL TEMPERATURE MEASUREMENT IN AN INTEGRATED CIRCUIT

FIELD OF THE INVENTION

The present invention is directed to measuring temperature, and more particularly, to enabling digital temperature measurement.

BACKGROUND OF THE INVENTION

Typically, applications, such as integrated circuits have used an analog device to measure temperature. For example, the amount of current flowing through a diode would be monitored and used to determine a temperature value. The current flowing through the diode would increase/decrease in relation to a change in temperature. However, an analog device is expensive to implement with highly integrated circuits. Also, most Very Large Scale Integration (VLSI) cells that are used to implement many integrated circuits cannot easily include such analog temperature measurement circuits.

DETAILED DESCRIPTION OF THE PREFERRED EMBODIMENT

Figure 1:
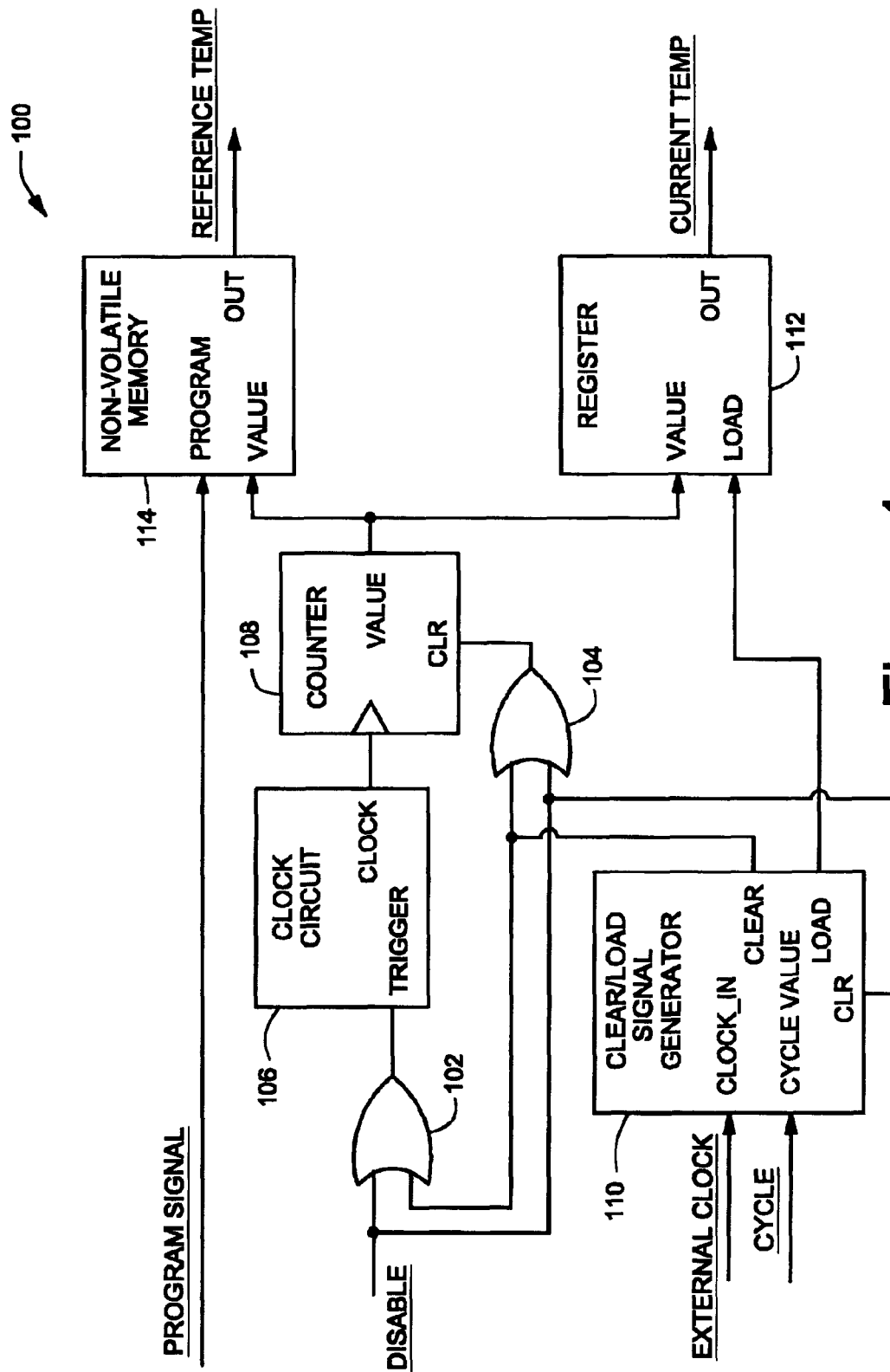
FIG. 1 illustrates a schematic diagram of a digital temperature measurement circuit.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

The present invention can be employed where it is desirous to provide a temperature measurement circuit that employs all digital components, such as for an integrated circuit. The invention measures a change in the period of a clock circuit caused by a change in its temperature and compares this change to a set of values that are based in part on a previously measured clock period at a predetermined temperature. During the manufacturing process, a die for an integrated circuit that includes the invention operating at a defined voltage is held at a predetermined temperature (such as 20 degrees Celsius), where a value of the period of the clock circuit is saved. The die may be manufactured from a variety of materials, including but not limited to Silicon and Gallium Arsenide. Also, the clock period can be saved in different ways, including, but not limited to, non-volatile memory, and a laser trimmed register.

The invention employs a period for a clock circuit at a predetermined temperature and a characteristic value for a particular fabrication process to calculate the slope of clock period versus temperature graph. The current clock period's value is used to calculate the current temperature with the linear equation (example given below). In this way, a highly accurate temperature measurement circuit using all digital components may be implemented for use with an integrated circuit. Typical applications might include any type of integrated circuit where it is desirous to measure temperature without employing analog devices.

FIG. 1 illustrates a block diagram of an exemplary temperature measurement circuit 100. A value representing the number of cycles of a clock period at a predetermined temperature and another value representing the number of clock periods at the current temperature over a length of time defined by an external clock are outputted for use by other components to determine the current temperature of an integrated circuit. Although not shown, these other components may include a processor and/or other electronic components that may use the determined current temperature to control power usage in the integrated circuit.

An external clock signal that does not vary with temperature is coupled to an input of Clear/Load Signal generator 110 and a Cycle value signal is coupled to another input of the generator. A Disable signal is coupled to an input of OR gate 102 and an input of OR gate 104, which is also coupled to a CLR input of generator 110.

The other input to OR gate 102 is coupled to the other input of OR gate 104, which is also coupled to the Clear output of generator 110. Activation of the Disable signal causes the generator 110 to activate its Clear output, which causes the output of OR gate 104 to make counter 108 clear its outputted value. Generator 110 has a load output that is coupled to a load input of register 112. When the load output of generator 110 is toggled, register 112 reads in the value outputted by counter 108 and provides that value as a representation of the current temperature on the register's Current Temp output. Also, the Cycle signal coupled to an input of generator 110 is employed to determine how many external clock periods will pass before the generator causes register 112 to load a value outputted by counter 108 and then clear the counter's outputted value (detail later).

The output of OR gate 102 is coupled to a Trigger input for clock circuit 106 (shown in greater detail in FIG. 2), whose output is coupled to a count input of counter 108, which counts the number of cycles of the periodic clock signal until its CLR input is activated. The activation of the output of OR gate 104 toggles the CLR input to counter 108 so that the current accumulation of clock periods are cleared and another set of clock periods are counted again. The output of counter 108 is provided to both non-volatile memory 114 and register 112.

The Program signal is coupled to the program input of non-volatile memory 114. During the manufacturing process, the Program signal is activated in a one shot process to cause the storing of a count of the number of clock circuit cycles at a predetermined temperature over a length of time. Since the length of time is known, the period of the clock circuit at the predetermined temperature can be calculated based on the number of counted clock circuit cycles. Later, the Program signal is disabled to enable the operation of the temperature measurement circuit under normal operating conditions.

Also, timing diagrams describing in greater detail the operation of temperature measurement circuit 100 are presented in FIGS. 3 and 4 below.

Figure 2:
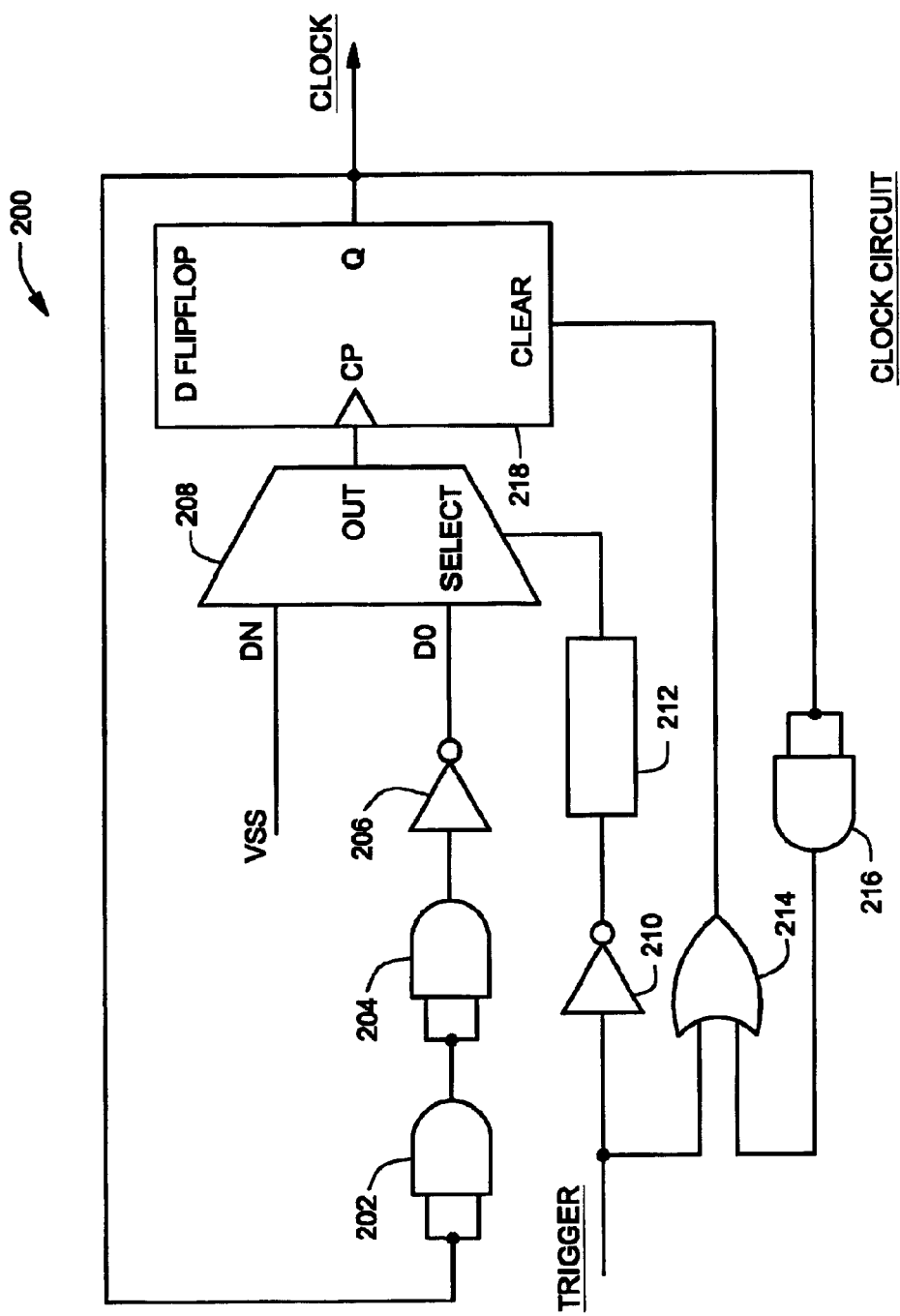
FIG. 2 shows a schematic diagram of a clock circuit employed in the digital temperature measurement circuit.

FIG. 2 illustrates a clock circuit 200 as discussed for FIG. 1 elsewhere in the specification. A trigger signal is coupled to an input of inverter 210 and an input to OR gate 214. When high, the Trigger signal will disable the operation of the clock circuit. The output of inverter 210 is coupled to an input of delay element 212 whose output is coupled to the Select input of Multiplexer 208. One input to Multiplexer 208 is tied to common. The output of Multiplexer 208 is coupled to a clock port of D Flip Flop 218. The output of OR gate 214 is tied to the Clear input of D Flip Flop 218. Also, the Q output port of D Flip Flop 218 is coupled to both inputs of AND gate 216 whose output is coupled to the other input to OR gate 214. Additionally, the Q output port of D Flip Flop 218 is coupled to both inputs of AND gate 202 whose output is coupled to both inputs of AND gate 204. The output of AND gate 204 is coupled to an input of inverter 206 whose output is coupled to another input of Multiplexer 208. Additionally, although AND gates 202, 204, and 216 along with delay component 212 are employed to tune the operation of the clock circuit, it is understood that any other combination of components may be used to attain the same results.

Clock circuit 200 operates as the temperature detection portion of the temperature measurement circuit shown in FIG. 1. Once triggered by a high to low transition of the Trigger signal, the Q output of D Flip Flop 218 enters into a self-sustaining toggling mode, i.e., the clock signal at the Q output is periodic. The period of the clock signal is determined in part by the clock to Q and Clear to Q delays internal to the D Flip Flop. However, since these delays are temperature dependent, the period of the clock signal is also temperature dependent. Since the relationship between the clock period and temperature is relatively linear for a given die (see FIG. 5), the period of the clock signal can be used to determine the current temperature.

Figure 3:
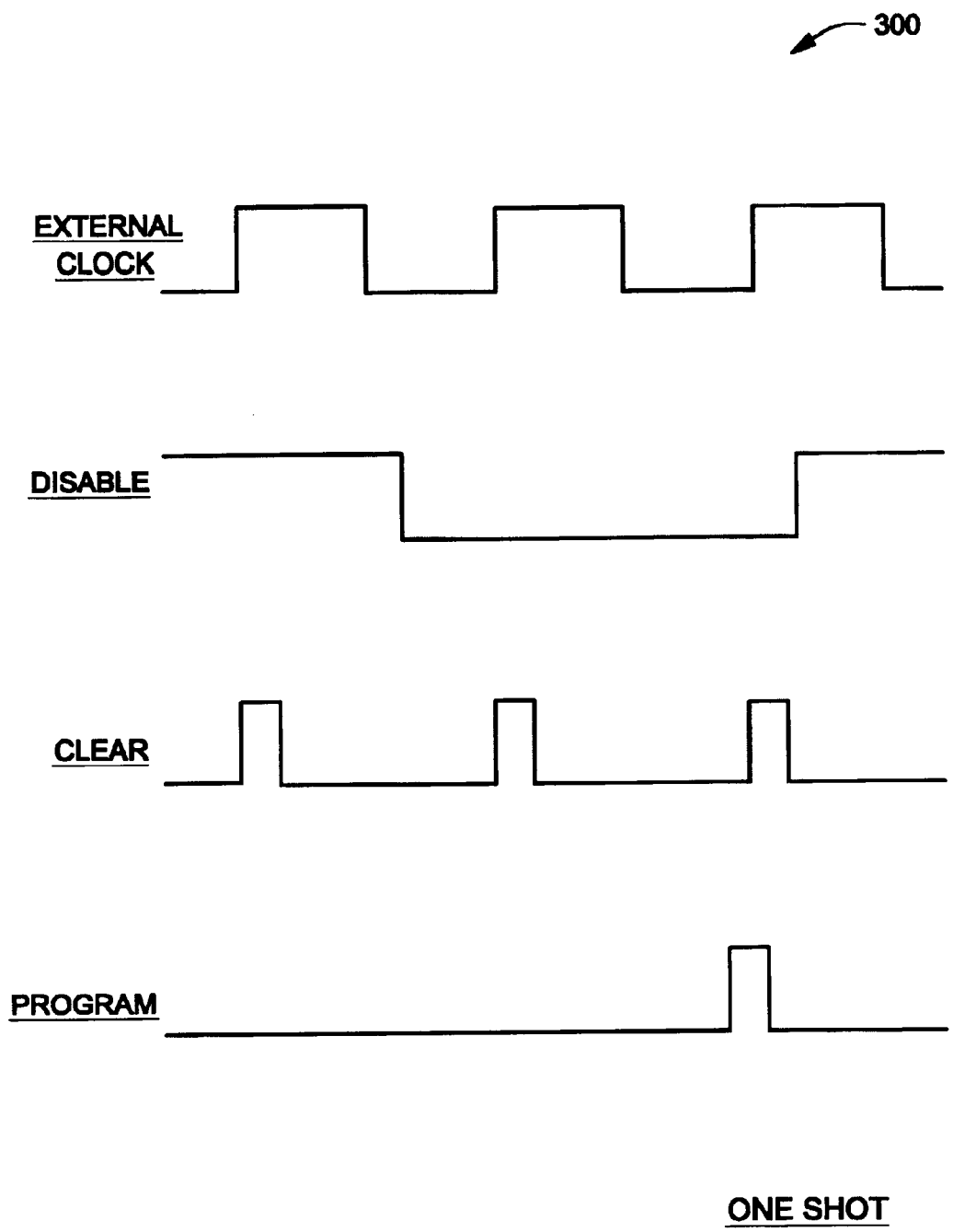
FIG. 3 illustrates a timing diagram for a one shot process.

FIG. 3 shows a timing diagram of the one shot process used during manufacturing to store a clock period in the non-volatile memory of the temperature measurement circuit illustrated in FIG. 1. During wafer testing at a predetermined temperature, the exemplary test sequence is used. An external clock signal of a known period is fed to the temperature measurement circuit. The clock circuit is then triggered into operation. On the rising edge of the external clock, the counter will be cleared. Before the next Clear signal pulse occurs, a Program signal pulse is provided to a non-volatile memory, which causes it to store and output the number of clock circuit cycles counted by the counter. By knowing the number of clock cycles stored by the non-volatile memory at the predetermined temperature, the exact period of the clock circuit at this temperature can be calculated.

Later, during normal operation of an integrated circuit, a process for determining the current temperature may be started by setting the disable signal low again. However, this time, the output of the counter is loaded into the register. From knowing the length of time that the clock circuit cycles were counted and how many, the actual period of the clock circuit can be calculated and employed to determine the current temperature of the integrated circuit. It should be noted that the clock circuit could be free running. The Disable signal, however, is added such that the clock circuit is triggered into operation only during temperature meaurement. Therefore, the temperature of the silicon is determined by the activity of the circuit around the detector, and not being influenced significantly by the clock circuit's activity itself.

Figure 4:
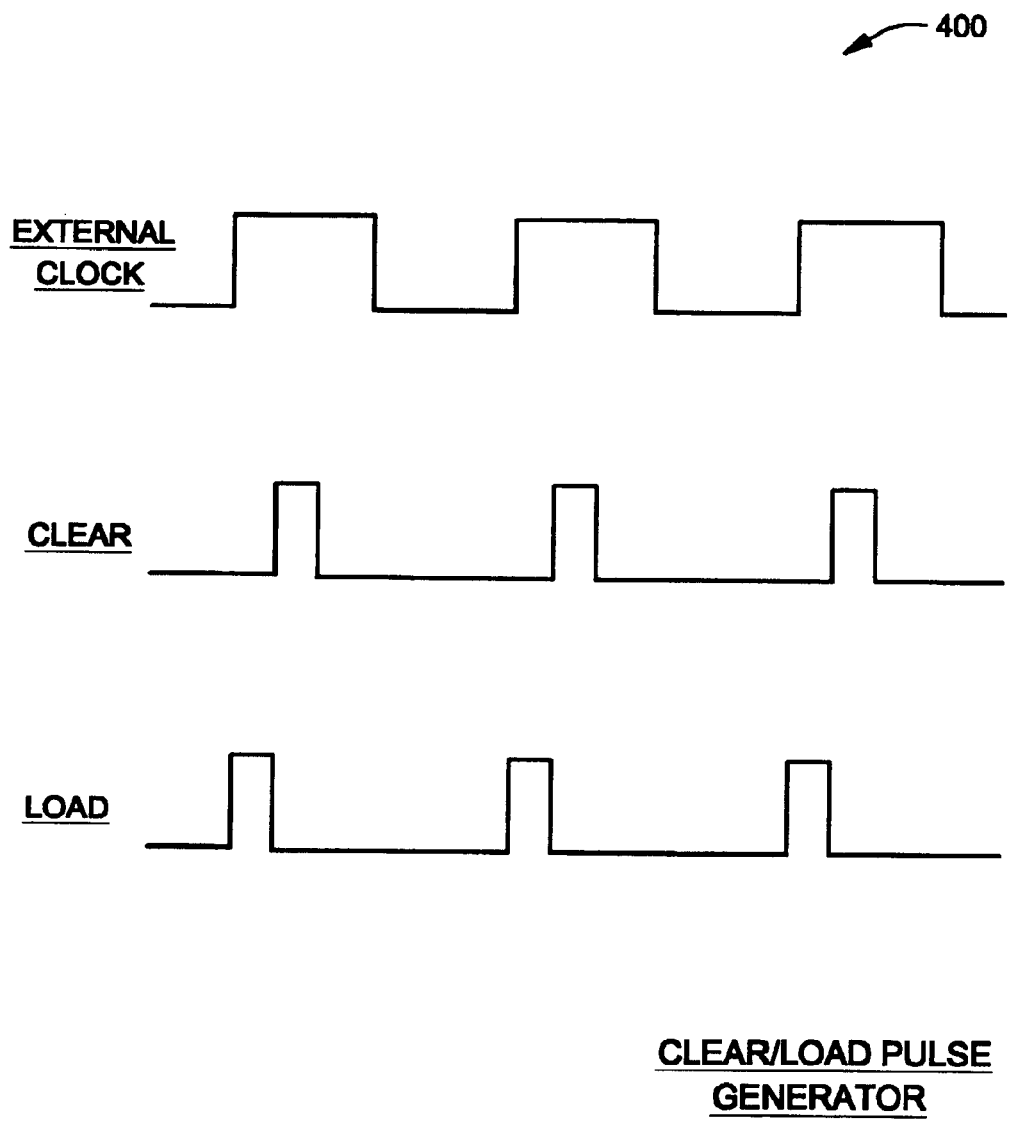
FIG. 4 shows a timing diagram for a clear/load pulse generator.

FIG. 4 illustrates another timing diagram where the operation of the Clear/Pulse Generator shown in FIG. 1 is presented. At the rising edge of the external clock signal, two short pulses, one delayed from the other, are outputted for each positive cycle of the external clock signal. As shown, once the register receives the Load signal, it will latch in the counter value; shortly thereafter, the Clear pulse causes the counter to be cleared.

These control signals (Clear, Load) should be a very small fraction of the external clock period. To minimize measurement error, the external clock period should be made large. Since signals are completely under control during manufacturing test, this requirement is not difficult to achieve. During normal operation, the system clock may be too fast to maintain good measurement accuracy. To minimize error during in system measurement, the Cycle signal is provided to the Clear/Load Signal Generator 110. This signal will change the frequency of the Clear and Load signals generation. Instead, for example, of Clear/Load signals on each clock cycle, they will be generated per the number of clock cycle indicated by the Cycle signal. Therefore, a larger number of clock pulses can be counted over a longer period; hence the error introduced by Clear and/or Load can be reduced.

Figure 5:
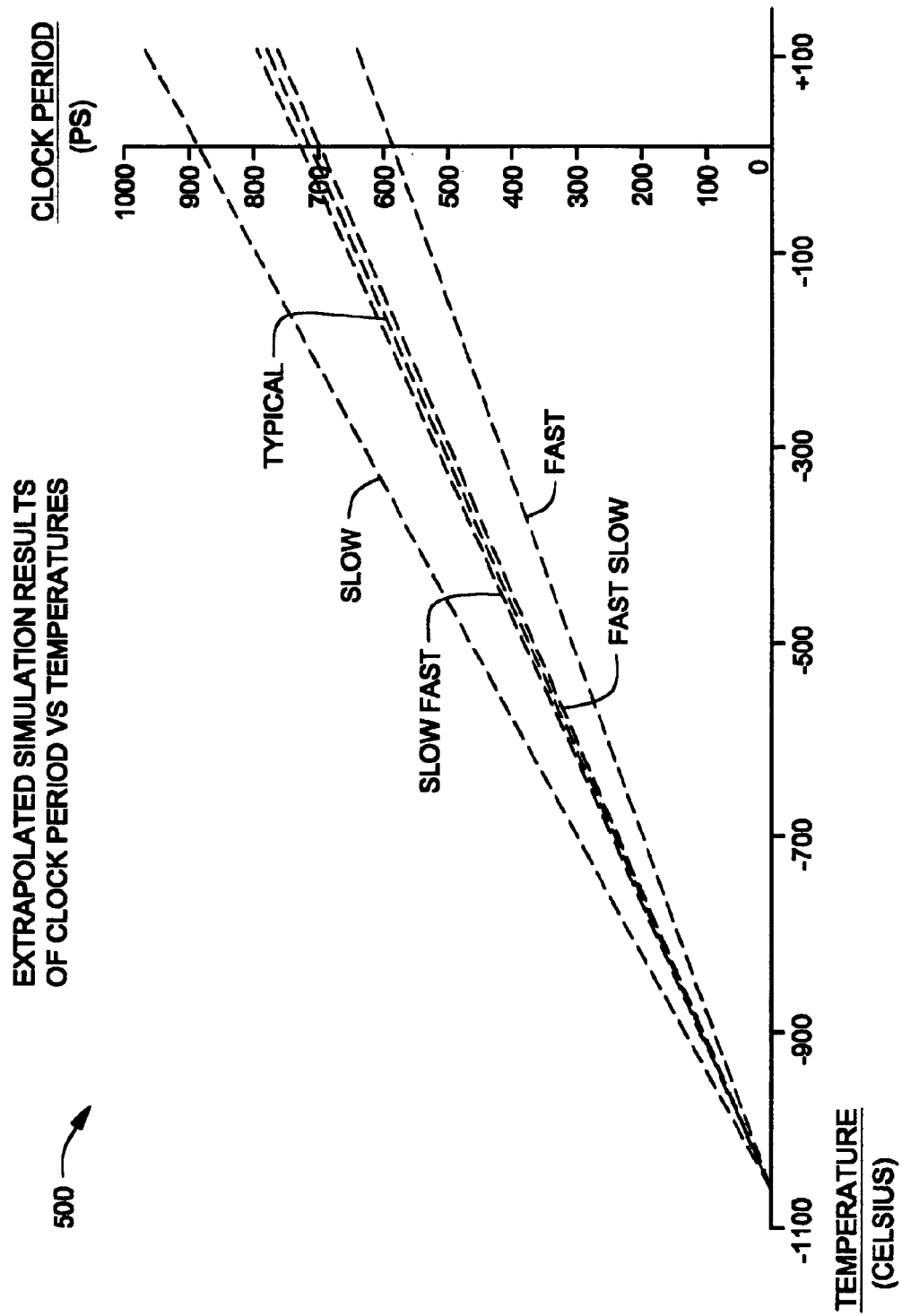
FIG. 5 illustrates a graph plotting clock period versus temperature, in accordance with the present invention.

FIG. 5 shows graph 500, which represents the temperature variation of the clock generator output from simulations. The same information can be obtained from measurements of the clock circuit output if circuits from different process corners are available. An important characteristic of this graph is that each line (behavior of the clock generator for a particular process corner) when extrapolated will meet at a common intercept. With this intercept, given the period of the clock generator at a known temperature (for example, measured during manufacturing test), the temperature at any other time can be calculated if the clock generator output period at that instance is obtained.

For exemplary purposes, the period for the clock circuit at 20 degrees Celsius during the simulation and/or testing of a particular clock generator is determined to be 729.1 ps. Looking to the graph shown in FIG. 5, the x-axis intercept is minus 1070 degrees Celsius. Thus, for this wafer, the slope equals (729.1 ps)/(1090 C). Later, the clock circuit is determined to output a periodic signal of 782.8 ps, where the slope is given by (782.8–729.1 ps)/(T–20 C). The temperature "T" can be calculated from the linear equation T equals (53.7/1.669)+20 C, i.e., T equals 100.3 degrees Celsius.

Furthermore, it is further envisioned that the clock circuit may be operated as a ring oscillator for an integrated circuit.

The above specification, examples and data provide a complete description of the manufacture and use of the invention. Since many embodiments of the invention can be made without departing from the spirit and scope of the invention, the invention resides in the claims hereinafter appended.

I claim:

1. An apparatus integral of an integrated circuit for measuring temperature of the integrated circuit, said apparatus comprising:
   (a) a clock circuit that includes at least one Flip Flop that outputs a signal having a delay that determines a period of the signal that is temperature dependent on the operation of the integrated circuit;
   (b) a storage component that stores a count of each period of a signal corresponding to a predetermined temperature over a predetermined length of time;
   (c) a generator that enables each period of the signal outputted by the clock circuit to be counted during operation of the integrated circuit over a first length of time; and
   (d) a register that outputs a count of each period of the clock circuit output signal that occurred during the first length of time, wherein the current temperature on the integrated circuit is determined based on the stored count of the period of the signal corresponding to the predetermined temperature and the outputted count of each said period of a first length of time.

2. The apparatus of claim 1, wherein the generator is operably coupled to a reference signal having a period that is temperature independent; wherein the reference signal is employed to determine the first length of time.

3. The apparatus of claim 1, wherein the generator causes the register to clear an output representing the count of each period of the clock circuit's signal during a first length of time, and wherein at the end of a second length of time that is substantially equivalent to the first length of time, the generator causes the register to load and output a current count of each period of the clock circuit signal.

4. The apparatus of claim 1, further comprising a counter to count each period of the clock circuit.

5. The apparatus of claim 1, wherein the storage component includes at least one of a non-volatile memory and a trimmed register.

6. The apparatus of claim 1, wherein each period of the clock circuit signal is outputted by a logic component, including at least one of a Flip Flop and Latch.

7. The apparatus of claim 1, wherein the register includes volatile memory.

8. The apparatus of claim 1, wherein the clock circuit operates as a ring oscillator for the integrated circuit.

9. The apparatus of claim 1, further comprising a processor for processing a linear equation that determines the current temperature based in part on the determined period of the clock circuit at the current temperature.

10. The apparatus of claim 1, further comprising a component that manages the power consumption of the integrated circuit based in part on the determined current temperature.

11. The apparatus of claim 1, wherein a larger count of each period of the clock circuit signal for the first length of time improves accuracy in determining the current temperature than a smaller count of each period of the clock signal for the first length of time.

12. The apparatus of claim 1, wherein the storage component stores the count of each period of the signal at the predetermined temperature over the predetermined length of time during characterization of the integrated circuit.

13. The apparatus of claim 1, wherein the first length of time occurs during operation of the integrated circuit.

14. An apparatus integral of an integrated circuit for digitally measuring temperature of the integrated circuit, said apparatus comprising:
   (a) a storage component that stores a count of a period of a temperature dependent signal corresponding to a predetermined temperature;
   (b) a counter that enables a period of a signal that varies as a function of the temperature of the integrated circuit to be counted during operation of the integrated circuit over a first length of time;
   (c) a register that outputs a count of each period of the signal that occurred during a said first length of time; and
   (d) a processor that determines the current temperature of the integrated circuit based on the stored count of the period of the signal at the predetermined temperature and the outputted count of each period during the first length of time.

15. An apparatus integral of an integrated circuit for measuring temperature of the integrated circuit, said apparatus comprising:
   (a) means for outputting a signal, wherein the means includes at least one Flip Flop having a delay that determines a period of the outputted signal that is temperature dependent on the operation of the integrated circuit;
   (b) means for storing a count of each period of a signal corresponding to a predetermined temperature over a predetermined length of time;
   (c) means for enabling each period of the temperature dependent signal to be counted during operation of the integrated circuit over a first length of time; and
   (d) means for outputting a count for each period of the temperature dependent signal that occurred during the first length of time, wherein the current temperature is determined based on the stored count of each period of the signal at the predetermined temperature and the outputted count of each period during the first length of time.

* * * * *

UNITED STATES PATENT AND TRADEMARK OFFICE
CERTIFICATE OF CORRECTION

PATENT NO. : 6,874,933 B1
DATED : April 5, 2005
INVENTOR(S) : Wai C. Chan

It is certified that error appears in the above-identified patent and that said Letters Patent is hereby corrected as shown below:

Column 4,
Line 62, delete "(53.7/1.669)" and insert -- (53.7/.669) --.
Lines 11-12, delete "meaurement" and insert -- measurement --.

Signed and Sealed this

Nineteenth Day of July, 2005

JON W. DUDAS
*Director of the United States Patent and Trademark Office*